June 29, 1937.　　　J. R. LEX　　　2,085,105
PORTABLE WELDING TOOL
Filed Oct. 4, 1935　　　2 Sheets-Sheet 1
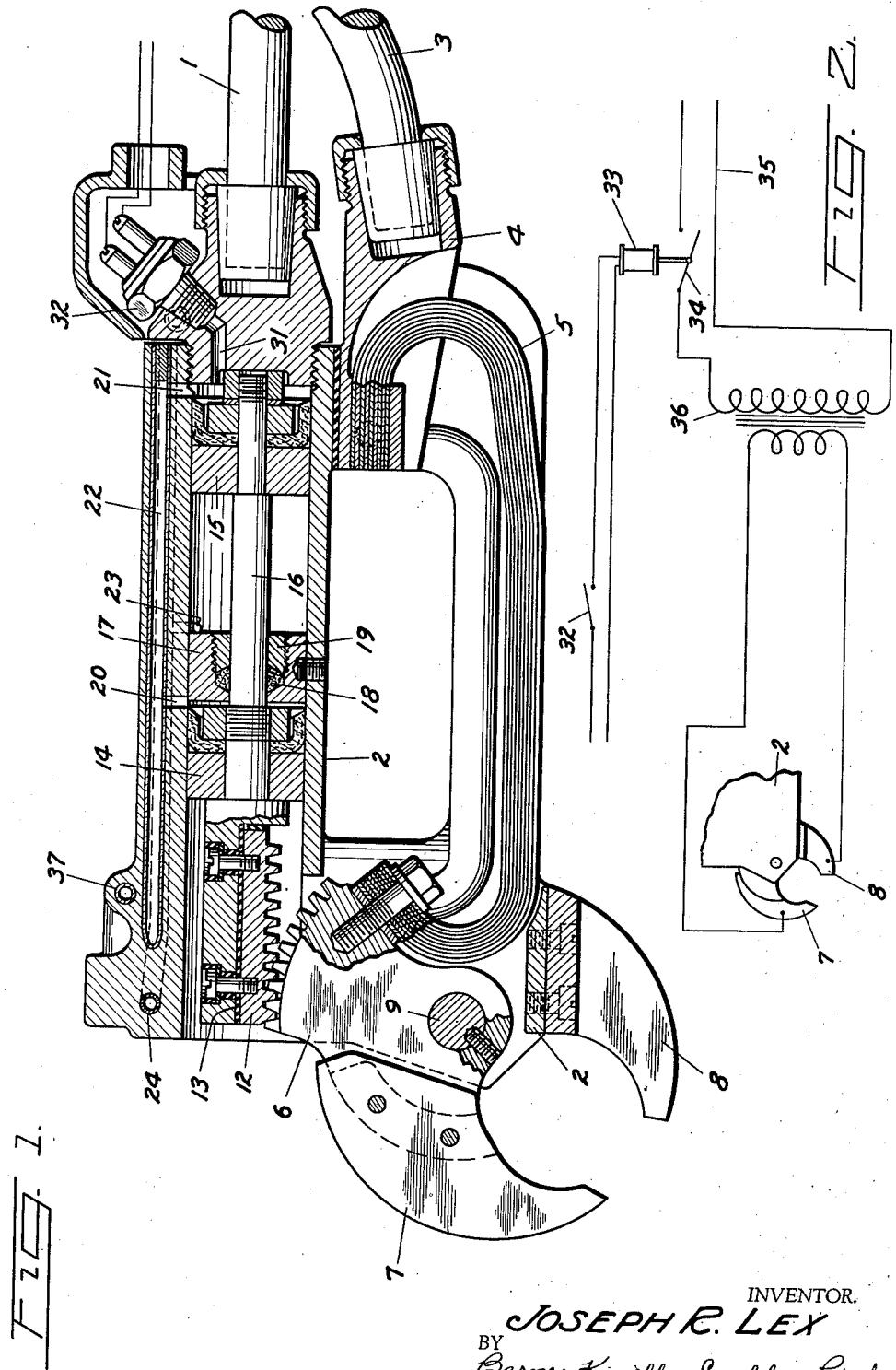

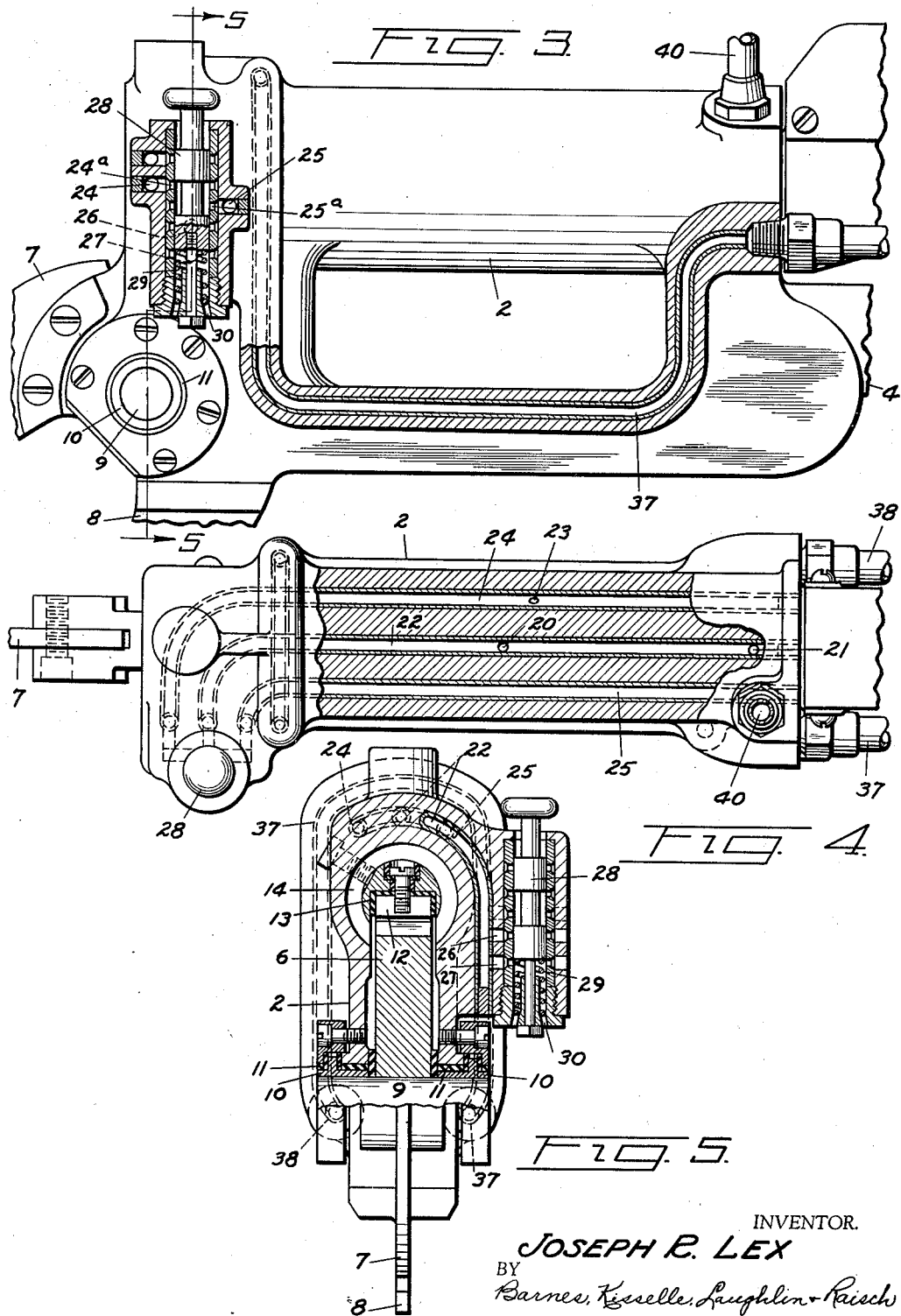

Patented June 29, 1937

2,085,105

UNITED STATES PATENT OFFICE 2,085,105

PORTABLE WELDING TOOL

Joseph R. Lex, Detroit, Mich., assignor to General Motors Corporation, Detroit, Mich., a corporation of Delaware Application October 4, 1935, Serial No. 43,473

4 Claims. (Cl. 219—4)

This invention relates to portable welding tools and has for its object a portable welding tool in which the tool is of minimum size and weight considering the pressure which is exerted upon the electrodes. To this end, the piston by which the elecrodes are pressed together is located in the handle and to permit the handle to be of minimum diameter and yet for the piston to exercise a heavy pressure upon the work, I employ a two-headed piston, wherein air is admitted behind each head. In order to make the tool as small and compact as possible all levers, links, etc. are eliminated and a simple rack and segment communicates the thrust of the piston to the movable electrode.

Referring to the drawings:

Fig. 1 is a view of the tool largely in longitudinal section.

Fig. 2 is a wiring diagram of the tool.

Fig. 3 is an elevation of the tool, partly in section, showing the valve construction.

Fig. 4 is a top elevation of the tool, partly in section.

Fig. 5 is a section on the line 5—5 of Fig. 3.

A flexible cable 1 brings the low voltage current to the lower electrode through the housing 2. The flexible cable 3 is connected into the socket member 4 to which the laminated conductor 5 is secured. This conductor is bolted to the tooth segment 6 which is secured to the upper electrode 7.

The lower electrode 8 is bolted to the housing 2. The two electrodes rotate one with respect to the other and somewhat resemble a pair of wire nippers. The upper electrode together with its segment 6 is secured by a set screw to the pintle 9 which rotates in collared sleeves 10 which are insulated by the insulation 11 from the lower electrode. The toothed rack 12 is insulated from the remainder of the piston member by the insulation 13.

The piston has two heads 14 and 15 with suitable cup washers. The piston rod 16 passes through the dividing wall 17 which divides the cylinder into two chambers. The packing 18 is held in place by a packing gland 19.

Air is admitted simultaneously behind both pistons through ports 20 and 21 and supplied through an air passage 22. Air is admitted through a single port 23 to return the pistons and open the electrodes. The air is supplied to the port 23 by a passageway 24. Air is supplied to the valve chamber through an air passageway 25. 26 and 27 are the air supply ports that lead from the air supply passageway 25 to the piston valve chamber. Air enters the passage 25, passes to the port 25a into the passage around piston valve 28, thence through the port 24a to the passage 24 which returns the pistons and opens the electrodes. When the valve is depressed, the piston valve connects the air supply passageway with the port 26 which leads into the passageway 22, thence to the chambers behind the pistons via the ports 20 and 21. When the pressure on the valve is relieved, the spring 29 returns the valve to the position shown in Fig. 3, and Fig. 5. In this position, the passageway 25 can exhaust through the port 27 and the ports 30 to the atmosphere.

When the air is turned into the passageway 22 behind the pistons, it also goes through the passageway 31 to the pressure switch 32 which controls the solenoid 33 that closes the switch 34 in the primary 35 of the transformer 36 that turns on the welding current.

Water is supplied through a passageway 37 which passes in proximity to the lower electrode then up around the casting at the front of the handle and back out the other side of the tool through the pipe 38. Air is supplied to the air intake 25 by the air hose 40. The handle requires circulation of water for cooling because the current passes directly through the handle. All the passageways are formed by tubing. This saves building the cores for the castings which would be obviously impossible.

The principle of the tool can be employed either in a conventional portable spot welding tool or in a bar welding tool, hence, the electrodes are referred to in the claims as "contacts" which means either electrodes in immediate contact with the work or contacts that engage a bus bar as in a bar welding tool.

What I claim is:

1. A portable welding tool, having in combination a pair of contacts, means for forcing the contacts together by fluid pressure comprising a hollow handle forming a pair of fluid cylinders in line, a compound two-headed piston for working in said cylinders and having a connection with the contacts comprising a toothed rack and a toothed segment, means for supplying fluid under pressure and a valve for controlling said fluid.

2. A spot welding tool, comprising a portable housing formed into a handle enclosing two fluid cylinders in line, a pair of contacts, means for moving said contacts relatively to each other comprising a compound piston having heads in line and one in each cylinder, means for supplying fluid under pressure to said cylinders and means for controlling said fluid, the said connection between the piston and the contacts comprising a toothed rack and a toothed segment.

3. A welding tool, comprising a housing formed as an electrical conductor and also as a handle containing a fluid cylinder, a flexible cable connected with said housing, an electrode secured to said housing, a socket member insulated from said housing but secured thereto, a flexible electrical cable connected with said socket member, a second electrode movably arranged on the housing but electrically insulated therefrom, a flexible cable connected to said movable electrode and said socket member, and a fluid controlled piston reciprocating in said cylinder and having a connection with said movable electrode which is divided into two electrically insulated parts.

4. A welding tool, comprising a housing formed as an electrical conductor and also as a handle containing a fluid cylinder, a flexible cable connected with said housing, an electrode secured to said housing, a socket member insulated from said housing but secured thereto, a flexible electrical cable connected with said socket member, a second electrode movably arranged on the housing but electrically insulated therefrom, a flexible cable connecting said movable electrode with said socket member, a fluid controlled piston reciprocating in said cylinder and having a connection with said movable electrode which is divided into two electrically insulated parts, said connection comprising a toothed rack having parts separated by electrical insulation and a toothed segment secured to the movable electrode.

JOSEPH R. LEX.